US012639766B1

(12) United States Patent
Trivilino et al.

(10) Patent No.: US 12,639,766 B1
(45) Date of Patent: May 26, 2026

(54) SYSTEMS AND METHODS FOR ROUNDING FINANCIAL TRANSACTIONS

(71) Applicant: The PNC Financial Services Group, Inc., Pittsburgh, PA (US)

(72) Inventors: Alan Barth Trivilino, Pittsburgh, PA (US); Dennis Michael Degnan, Jr., Pittsburgh, PA (US); Stephanie Elizabeth Rodgers, Dublin, OH (US); Vorachat Tamarree, Pittsburgh, PA (US); Terry Alan Boring, II, Pittsburgh, PA (US); Rostislav Rybalov, Pittsburgh, PA (US); Joseph Asher Friedman, Pittsburgh, PA (US); Erick Alejandro Villanueva Molina, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 40 days.

(21) Appl. No.: 18/620,429

(22) Filed: Mar. 28, 2024

Related U.S. Application Data

(63) Continuation of application No. 18/132,095, filed on Apr. 7, 2023, now abandoned.

(60) Provisional application No. 63/385,001, filed on Nov. 25, 2022.

(51) Int. Cl.
G06Q 40/00 (2023.01)
G06F 3/04817 (2022.01)
G06Q 40/06 (2012.01)

(52) U.S. Cl.
CPC ......... G06Q 40/06 (2013.01); G06F 3/04817 (2013.01)

(58) Field of Classification Search
CPC ............................ G06Q 40/06; G06F 3/04817
See application file for complete search history.

(56) References Cited

U.S. PATENT DOCUMENTS

| 8,341,063 B1 * | 12/2012 | Cernyar | G06Q 40/06 |
| | | | 705/36 R |
| 10,467,663 B1 * | 11/2019 | Ocampo | G06Q 40/06 |
| 2011/0054995 A1 * | 3/2011 | Roostai | G06Q 20/20 |
| | | | 705/16 |

(Continued)

FOREIGN PATENT DOCUMENTS

WO      WO-2022086928 A1 *   4/2022   .......... G06Q 40/062

OTHER PUBLICATIONS

Klimek: "Financial Optimization of the Resource-Constrained Project Scheduling Problem with Milestones Payments", Appl. Sci. 2021, 11, 661, Published: Jan. 12, 2021 (Year: 2021).*

(Continued)

*Primary Examiner* — Edward J Baird
(74) *Attorney, Agent, or Firm* — Finnegan, Henderson, Farabow, Garrett & Dunner, LLP

(57)      ABSTRACT

A system for rounding financial transactions for future investments into a personalized investment account is disclosed. The system may involve pulling extra change into a new investment account. The system may involve icons that represent varying financial transactions. The system may further involve questions that determine how many years a user would be comfortable investing. The system may further involve suggesting a portfolio for the user, in which a contribution milestone represents the progression of investments based on the amount invested over a time period.

20 Claims, 12 Drawing Sheets

(56) References Cited

U.S. PATENT DOCUMENTS

| | | | |
|---|---|---|---|
| 2015/0087426 A1* | 3/2015 | Schulz | G07F 17/3272 463/43 |
| 2020/0111332 A1* | 4/2020 | Gervais | G06Q 20/4014 |
| 2021/0319515 A1* | 10/2021 | Natali, Jr. | G09B 5/06 |

OTHER PUBLICATIONS

Acorns®; "Acorns in a Nutshell"; © May 2021 Acorns Grow Incorporated.

* cited by examiner

300

9:41

✕

Set Up          Verify          Select          Open

Before we select a portfolio

How many years are you comfortable
keeping your money invested?

+2          2-5          5-8          8+

302

NEXT

Why are you asking me this?

We want to recommend the right portfolio
for your financial goals. A more
aggressive investing strategy can make
sense for investors who have more time
to build value.

Tell me more

2-5 years

USER 301

Pocket Round Up App

*FIG. 3*

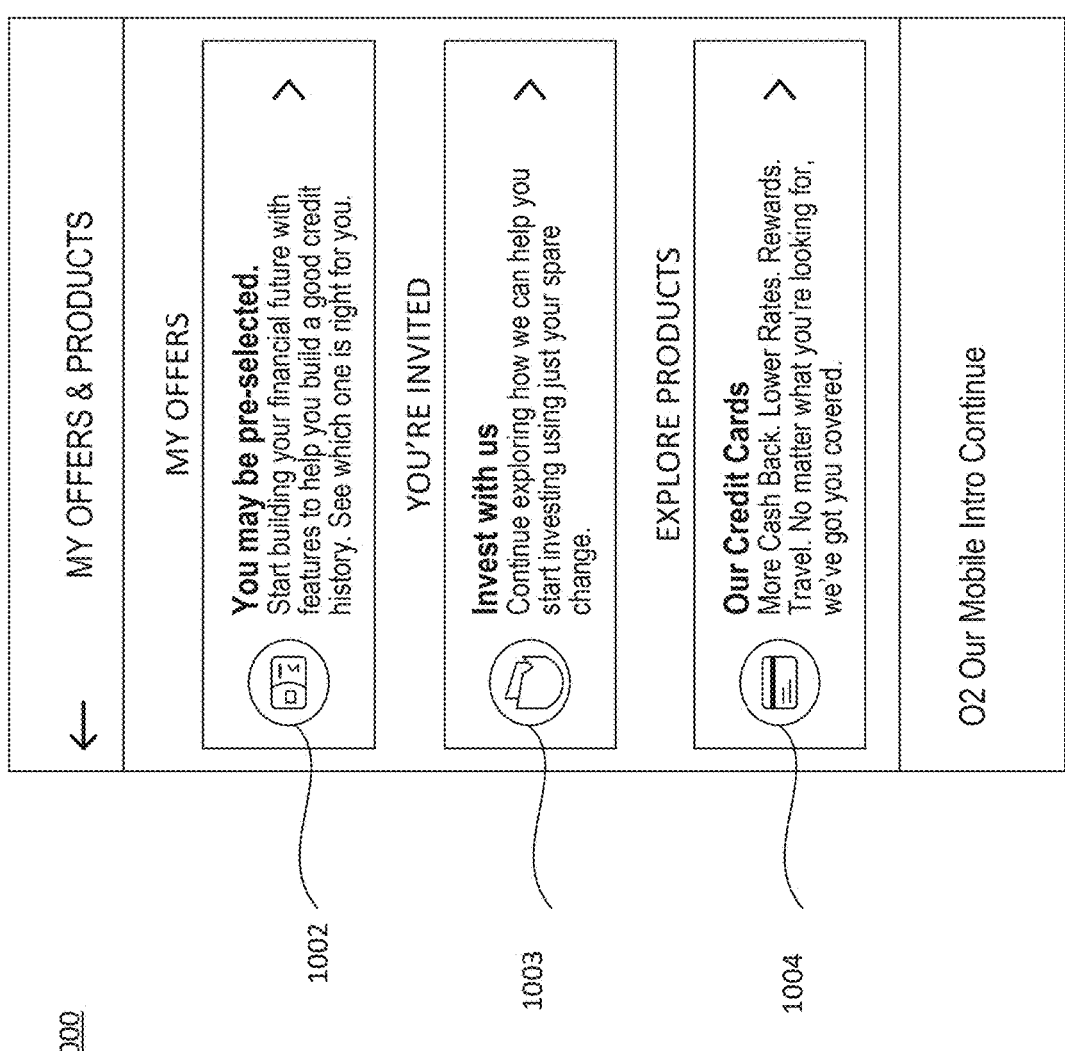

MY OFFERS & PRODUCTS

MY OFFERS

You may be pre-selected.
Start building your financial future with features to help you build a good credit history. See which one is right for you.

YOU'RE INVITED

Invest with us
Continue exploring how we can help you start investing using just your spare change.

EXPLORE PRODUCTS

Our Credit Cards
More Cash Back. Lower Rates. Rewards. Travel. No matter what you're looking for, we've got you covered.

O2 Our Mobile Intro Continue

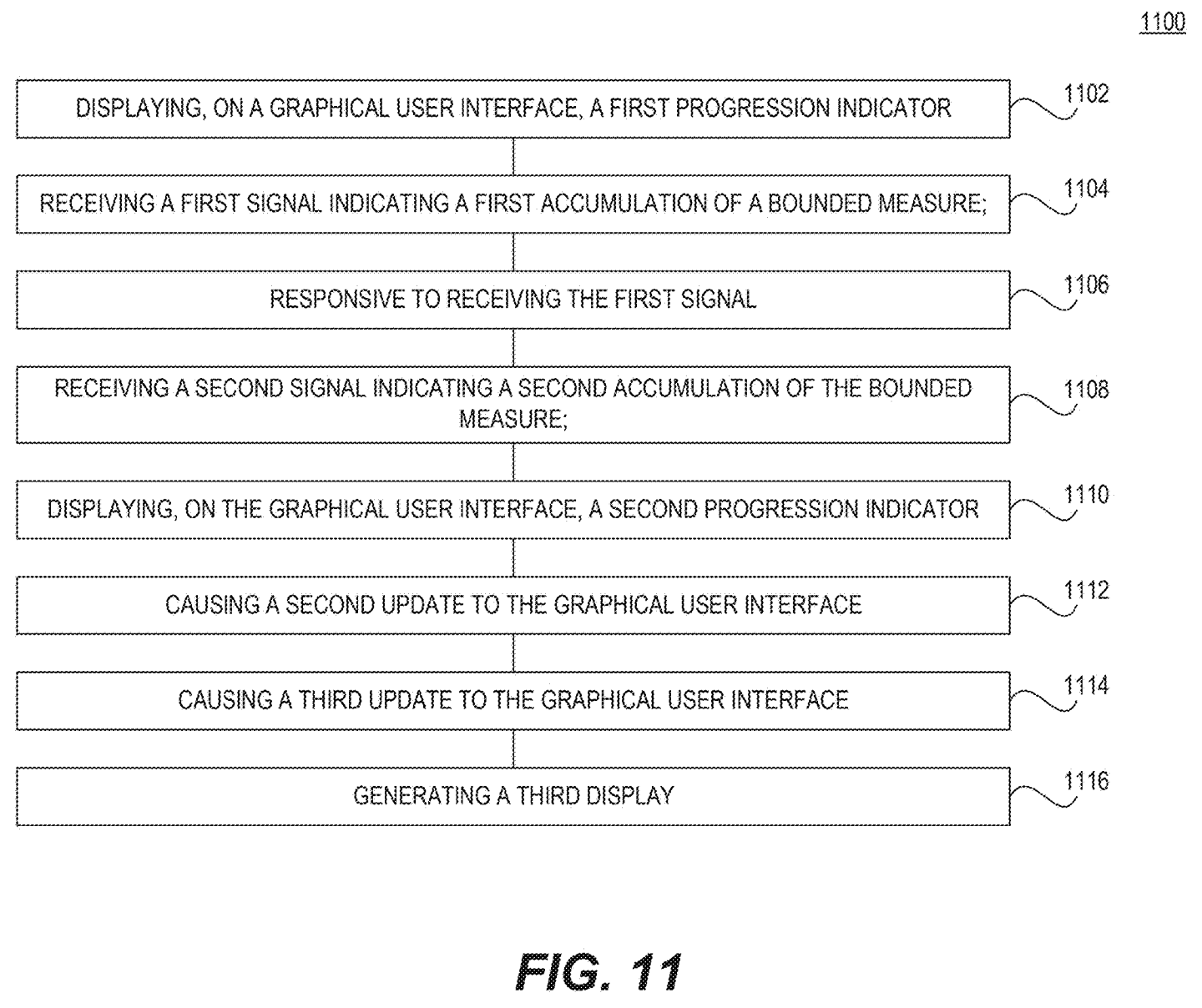

1102 DISPLAYING, ON A GRAPHICAL USER INTERFACE, A FIRST PROGRESSION INDICATOR

1104 RECEIVING A FIRST SIGNAL INDICATING A FIRST ACCUMULATION OF A BOUNDED MEASURE;

1106 RESPONSIVE TO RECEIVING THE FIRST SIGNAL

1108 RECEIVING A SECOND SIGNAL INDICATING A SECOND ACCUMULATION OF THE BOUNDED MEASURE;

1110 DISPLAYING, ON THE GRAPHICAL USER INTERFACE, A SECOND PROGRESSION INDICATOR

1112 CAUSING A SECOND UPDATE TO THE GRAPHICAL USER INTERFACE

1114 CAUSING A THIRD UPDATE TO THE GRAPHICAL USER INTERFACE

1116 GENERATING A THIRD DISPLAY

*FIG. 11*

SYSTEMS AND METHODS FOR ROUNDING FINANCIAL TRANSACTIONS

CROSS-REFERENCES TO RELATED APPLICATION

This application claims the benefit of the priority of U.S. Provisional Patent Application No. 63/385,001 filed on Nov. 25, 2022, the entire contents of which are incorporated herein by reference.

TECHNICAL FIELD

The present disclosure relates to systems and methods for rounding financial transactions for future investments into a personalized investment account.

BACKGROUND

There has been a growing trend in financial technology applications that allow for users to save their money and manage their finances. Currently, this includes "round-up" applications, which automatically round up transactions to the nearest dollar for a user's account. Despite many round-up applications being present on the market, round-up apps currently have limited customization options for a user's saving goals. This current challenge may frustrate current users who want to have a more personalized experience for managing their finances, such as milestone tracking, tailored investments according to a user's long-term goals, and developing a comprehensive savings strategy.

SUMMARY OF THE DISCLOSURE

The disclosed embodiments include systems and methods for rounding financial transactions for future investments into a personalized investment account. The disclosed embodiments, include an advanced protocol for extracting account information to read and process data from various data systems such as Mainframe files, Windows files, Unix files, and Database tables.

Embodiments of the present disclosure provide a computing system including a memory for storing instructions. One or more processors may be configured to execute the instructions to: display, on a graphical user interface, a first progression indicator illustrating a meandering line containing one or more concave portions and indicative of an unbounded measure having no defined end; receive a first signal indicating a first accumulation of a bounded measure; responsive to receiving the first signal, causing a first update to the graphical user interface including graphically illustrating a partial traversing of a closed object, and illustrating within at least a portion of a first concave portion of the one or more concave portions of the meandering line; receive a second signal indicating a second accumulation of the bounded measure; display, on the graphical user interface, a second progression indicator situated within one of the concave portions and illustrating a closed object indicative of a bounded measure having a defined end, the defined end indicated by completely traversing the closed object; cause a second update to the graphical user interface including graphically illustrating a complete traversing of the closed object, and illustrating an advancement of the first progression indicator along the meandering line beyond the first concave portion; and cause a third update to the graphical user interface to graphically illustrate a completion by: after the first progression indicator graphically illustrates the advancement, generating a third display that replaces the closed object with a completion symbol.

advancement, generating a third display that replaces the closed object with a completion symbol.

Embodiments of the present disclosure provide a computer-implemented method including a memory for storing instructions. The method may comprise one or more processors that may be configured to execute the instructions to: display, on a graphical user interface, a first progression indicator illustrating a meandering line containing one or more concave portions and indicative of an unbounded measure having no defined end; receive a first signal indicating a first accumulation of a bounded measure; responsive to receiving the first signal, causing a first update to the graphical user interface including graphically illustrating a partial traversing of a closed object, and illustrating within at least a portion of a first concave portion of the one or more concave portions of the meandering line; receive a second signal indicating a second accumulation of the bounded measure; display, on the graphical user interface, a second progression indicator situated within one of the concave portions and illustrating a closed object indicative of a bounded measure having a defined end, the defined end indicated by completely traversing the closed object; cause a second update to the graphical user interface including graphically illustrating a complete traversing of the closed object, and illustrating an advancement of the first progression indicator along the meandering line beyond the first concave portion; and cause a third update to the graphical user interface to graphically illustrate a completion by: after the first progression indicator graphically illustrates the advancement, generating a third display that replaces the closed object with a completion symbol.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 3 depicts an exemplary illustration of a user using a mobile device in a "select mode" to select their desired number of years for investment proposed by the Pocket Application, consistent with disclosed embodiments;

FIG. 10 depicts an exemplary user interface on a mobile device for visualizing various products and offers, consistent with disclosed embodiments;

FIG. 11 depicts a flowchart for a method of rounding financial transactions, consistent with disclosed embodiments;

DETAILED DESCRIPTION

Figure 1:
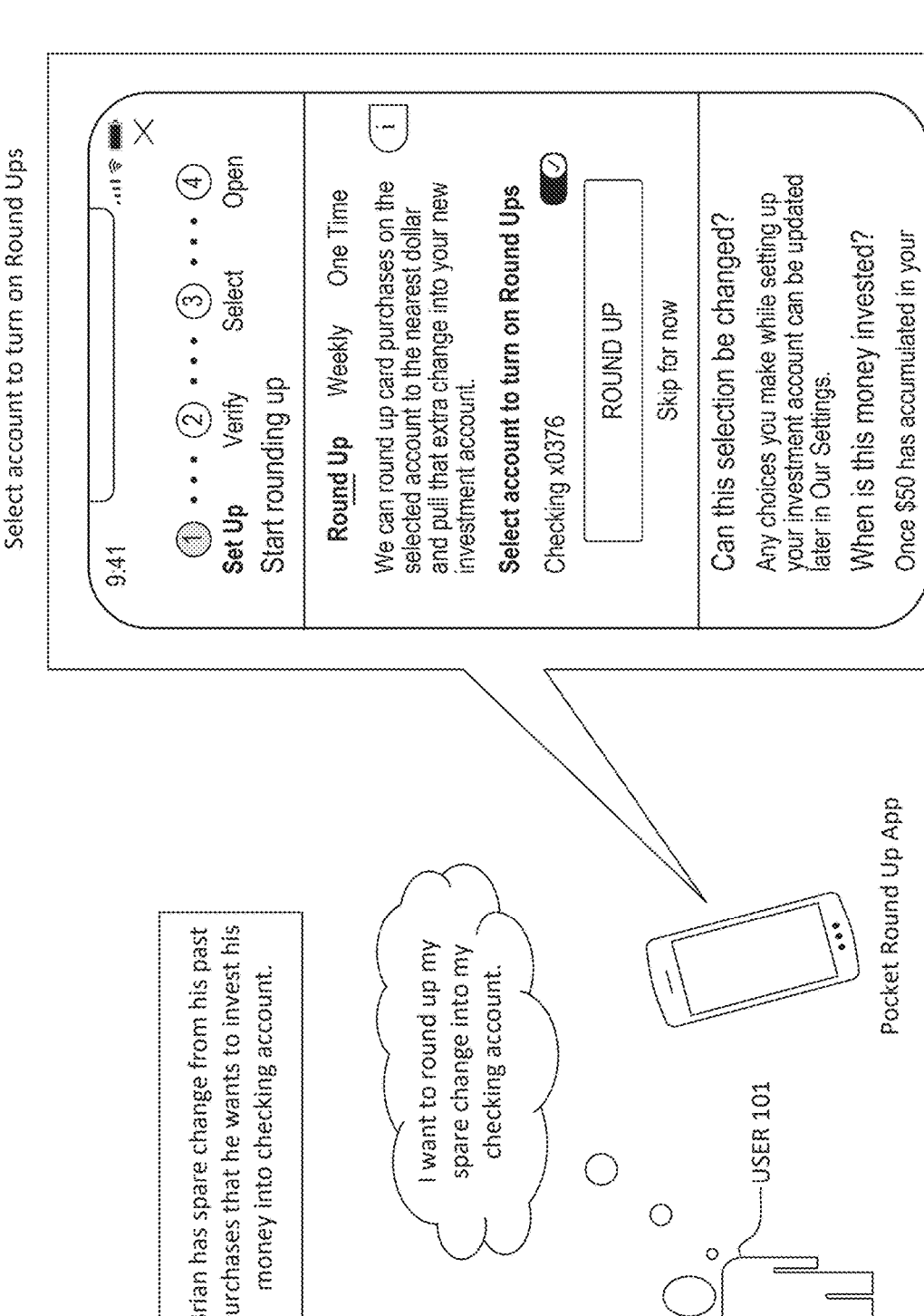
FIG. 1 depicts an exemplary illustration of a user using a mobile device to select an account to use a Pocket Application, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the envisioned embodiments. Similarly, additional steps may be added, or steps may be removed without departing from the envisioned embodiments. Thus, the materials, methods, and examples are illustrative only and are not intended to be necessarily limiting.

Embodiments herein include computer-implemented methods, tangible non-transitory computer-readable media, and systems. The computer-implemented methods may be executed, for example, by at least one processor (e.g., a processing device) that receives instructions from a non-transitory computer-readable storage medium. Similarly, systems consistent with the present disclosure may include at least one processor (e.g., a processing device) and a memory, and the memory may include a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, non-volatile memory, hard drives, compact disc (CD) ROMs, digital optical discs (DVDs), flash drives, disks, and/or any other known physical storage medium. Singular terms, such as "memory" and "computer-readable storage medium," may additionally refer to multiple structures, such a plurality of memories and/or computer-readable storage mediums. As referred to herein, "digital nudging" may refer to the use of user-interface design elements, to assist in guiding a user's behavior in online decision making. Online decision making may be influenced by the environment in which choices are presented to a user, as presenting choices in certain ways may "nudge" a user to change their behavior in predictable ways. "Nudging" as used herein, may further refer to how minor changes to decision environments in a user interface (e.g., setting defaults) can influence decision outcomes.

The Pocket Round Up application utilizes slide bars to toggle among decisions relating to a user's preferred investment decision and progress bars for a milestones map for visualizing progression towards a user's contribution milestone. The Pocket Round Up application influences user behavior through "digital nudging" for displaying information to a user, which is more than well understood in the art and represents the routine use of a display device.

Using digital nudging, a user interface in the Pocket Round Up application may not only consist of a routine for displaying information, but also serves as a component for user interfaces displaying financial information to a user. For example, digital nudging may prompt a user to make better financial decisions such as by displaying to a user that they can start investing small amounts and watch their account grow over time. The Pocket Application may display to the user as a suggestion, that they may be able to start contributing an amount they've selected from their checking account to their investment account every Friday. This suggestion may serve to influence the user to have the incentive to want to invest weekly. Furthermore, with the slide bar in the user-interface presenting relatively low investment contributions, this may prompt the user to want to invest more frequently, as they may be able to start off with smaller contributions over time rather than having to invest large sums of money into their account that they may not have, which may affect their decision to want to invest weekly.

As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

In view of the above identified problems and deficiencies, provided herein are systems and methods that include rounding financial transactions for future investments into a personalized account with improved customization options. Novel systems and methods for a virtual wallet showing a user's investment portfolio are described herein and in the accompanying figures. Further, novel systems and methods of gathering information from a user to determine their suggested portfolio are described herein and in the accompanying figures.

The Pocket Application described herein is a mobile banking application that invests spare change into a customized investment account, which involves rounding up card purchases on a selected account to the nearest dollar. "Rounding up" as used herein may refer to a process of rounding up each credit or debit card purchase to the nearest whole number, e.g., the nearest dollar. The Pocket Application may also allow for investing remaining change from the card purchase into a diversified investment portfolio or account based on a user's financial goals. The investment account may be a checking account or savings account associated with a user at their respective financial institution.

The Pocket Application may use an API (Application Programming Interface) provided by the user's financial institution to access account information, the transaction history of the user, and the user's balances. An API as used herein may refer a set of definitions and protocols to build and integrate application software. Exemplary API protocols may include REST (representational state transfer), RPC (remote procedural call), and SOAP (simple object access protocol). The API may allow for the Pocket Application to initiate monetary transfers between accounts, such as transferring rounded-up card purchases from the user's checking account to their designated savings account.

The transaction amount may be represented as decimal-point numbers that use specialized data types and precision levels to accurately round up card purchases. A decimal-point number as used herein may refer to a whole number with a decimal point. For example, if the user makes a card purchase for $5.50, the Pocket Application will round up the amount to $6.00 and transfer $0.50 to a user's designated savings or investment account. Data types as used herein may refer to the type of data that can be used in a calculation for rounding up. For example, the Pocket Application may use a decimal data type with higher levels of precision. The decimal data type may be the input data, e.g., a monetary value such as $2, $3, $4, and $5. Precision levels as used herein may refer to the level of accuracy when rounding up card purchases. Precision levels may include whole number precision, when rounding card purchases to the nearest dollar. Whole number precision may involve, for example if a user makes a purchase for $10.50, the Pocket Application rounds up the card purchase to $11.

FIG. 1 depicts an exemplary illustration of a user 101 using a mobile device to select an account to use the Pocket Application. In this example, user 101 has spare change from a past purchase that user 101 wants to invest into their designated savings account. User 101 may "round up" remaining change into their designated savings account using a mobile banking application associated with their respective financial institution. The Pocket Application may deposit the spare change into user 101's customized investment account, so that it can round up card purchases to the nearest dollar and invest remaining change into a new investment account designated for "round-up" transactions.

Figure 2:
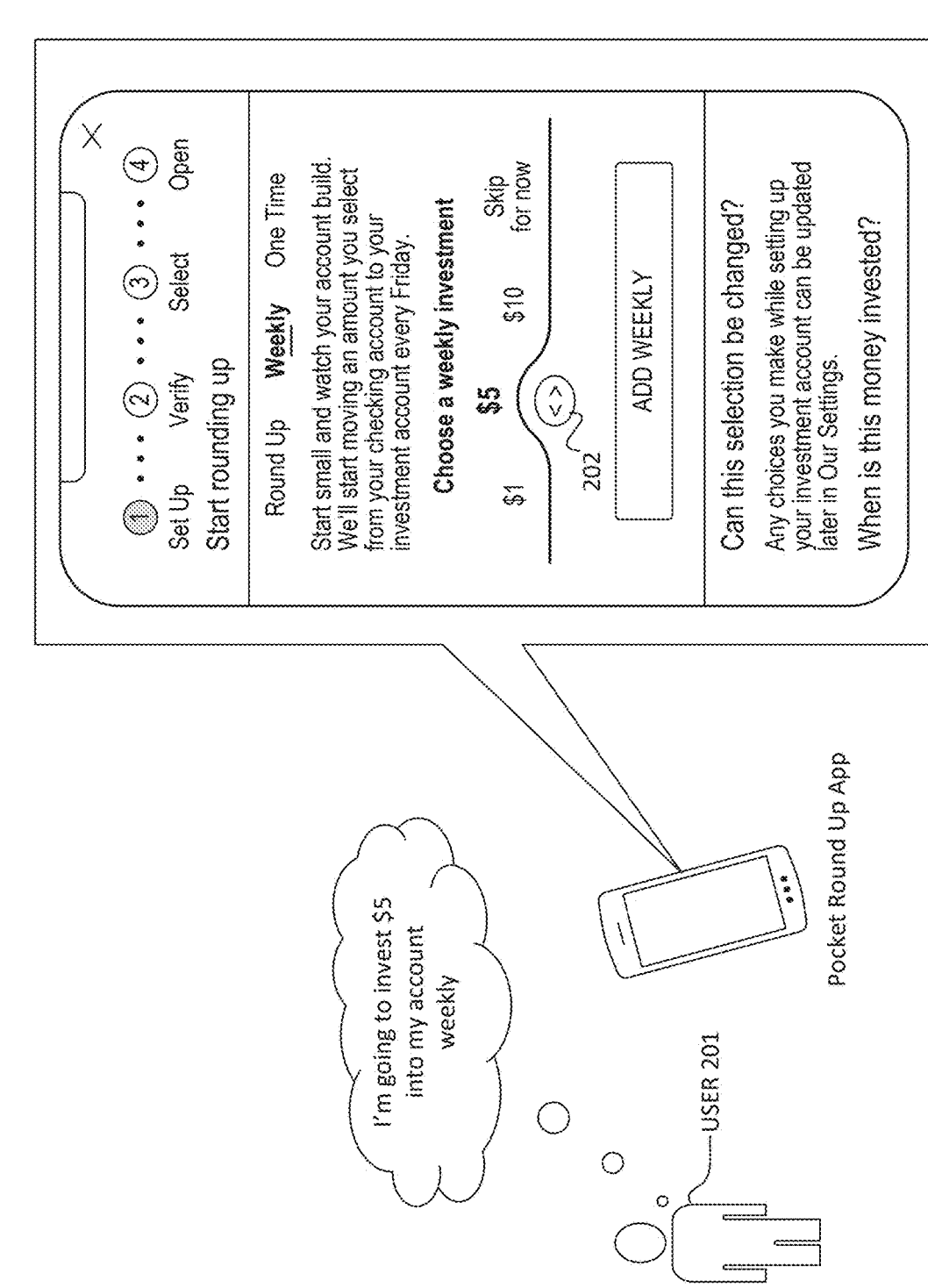
FIG. 2 depicts an exemplary illustration of a user using a mobile device in a "setup" mode to select their desired weekly investment contribution proposed by the Pocket Application, consistent with disclosed embodiments.

FIG. 2 depicts an exemplary illustration of a user 201 using a mobile device 200 in a "setup" mode to select their desired weekly investment contribution, proposed by the Pocket Application. In this example, user 201 wants to invest $5 into their designated savings account on a weekly basis. In some embodiments, a closed object is configured as a toggle button, e.g., toggle button 202 to enable the user to toggle among varying values along a slide bar. For example, the slide bar includes a range of suggested monetary values, that upon toggle button 202 being selected, may allow the user to slide toggle button 202 along the slide bar to their desired monetary value for weekly investing. Furthermore, the closed object may include values that represent a range of an amount the user intends to allocate weekly. In some embodiments, the closed object has a shape of a circle, a square, a rectangle, or a polygon. The closed object as used herein may refer to an enclosed shape.

Toggle as used herein may refer to alternating between one or more options using a GUI element such as a button. The button can be used to switch between a range of monetary values, that user 201 may select to invest weekly. The closed object may be configured to toggle among varying values by having two arrows that toggle according to their direction. For example, toggle button 202 may allow the user to switch between values relating to suggested weekly investments such as $1, $5, $10, etc. Toggle button 202 upon its left arrow being selected, may represent a lower weekly investment, e.g. $1. Selecting the right arrow within toggle button 202, may represent a greater weekly investment, e.g., $10. Alternatively, if the user 201 is not sure how much they want to invest weekly, the user 201 may use toggle button 202 to skip temporarily, a weekly investment. In this example, user 201 may proceed with selecting $5 as their weekly investment contribution from their checking account that to be transferred into their investment account on a reoccurring specific day of the week such as Friday or any other day of the week.

FIG. 3 depicts an exemplary illustration of a user using a mobile device 300 in a "select" mode to select their desired number of years for investment, proposed by the Pocket Application. In this example, before selecting a portfolio, a user 301 may be presented the option of deciding how many years they would be comfortable keeping their money invested in their designated savings or investment account. In some embodiments, the closed object may include a toggle option, using a toggle button 302, that allows the user to switch between varying values for specific periods that the user intends to invest. Values as used herein may refer to the numeric values representing the number of years, presented to the user such as 2-5 years, 3-8 years, 5-10 years, or any other period within 365 days or more. For example, the slide bar includes a range of years, that upon the toggle button 302 being selected, may allow the user to slide it to their desired number of years. The specific periods as used herein may refer to the number of years that user 301 would want to keep their money invested. For example, the number of years may range from 2, 2-5, 5-8 or 8+years, between which user 301 may want to select their desired number of years to invest. Toggle button 302 upon its left arrow being selected, represents a period of two years, e.g., +2. Upon the right arrow being selected within toggle button 302, toggle button 302 may represent a longer period that user 301 may want to invest, e.g., 8+. In the exemplary illustration, user 301 decides that they want to invest their money for 2-5 years, in which the Pocket Application may set this period for any investments for user 301.

Figure 4:
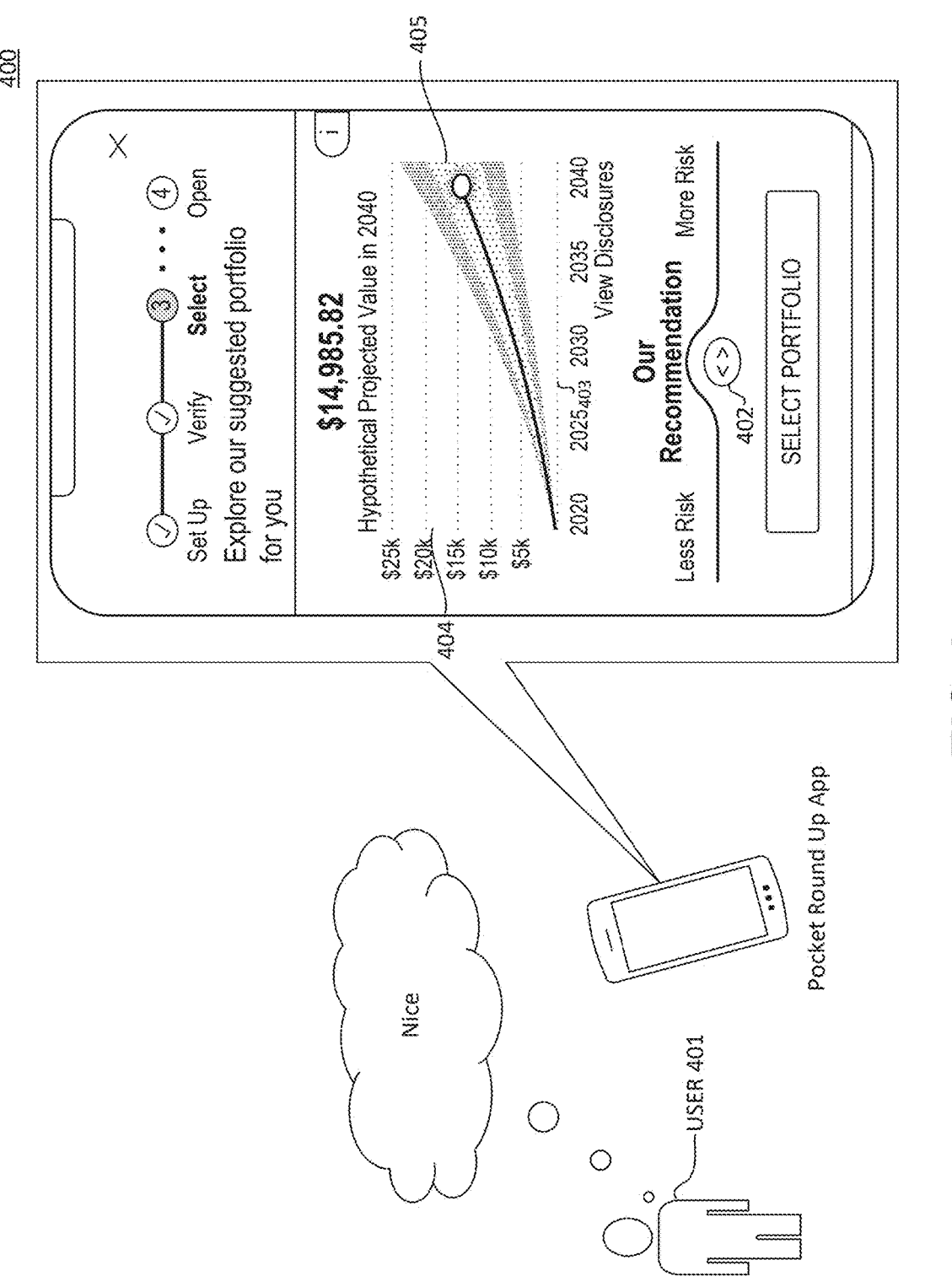
FIG. 4 depicts an exemplary illustration of a user receiving their suggested portfolio created by their mobile device's Pocket Application, consistent with disclosed embodiments.

FIG. 4 depicts an exemplary illustration of a user 401 using a mobile device 400 to receive their suggested portfolio created by their mobile device's Pocket Application. In this example, the Pocket Application may present a hypothetical projected value for user 401's suggested portfolio. A graph 405 depicts a linear graph, for a suggested portfolio for user 401 for the year 2040. A linear graph as used herein, may refer to a straight line graph that is drawn on a plane connecting the points plotted on x and y coordinates. A linear graph for the Pocket Application, may display values that increase by a certain increment. For example, graph 405 includes an x-axis 403, which represents the number of years that user 401's investments may grow, by increments of five years, e.g., 2020, 2025, 2030, 2035 and 2040. Graph 405 also includes a y-axis 404, which represents the range of projected values for user 401, e.g., $5,000, $10,000, $15,000, $20,000 and $25,000.

The projected values may be calculated using linear regression. Linear regression as used herein may refer to modeling the relationship between two variables and estimating the value of a response by using a line-of-best-fit. For example, the projected values may be calculated by fitting a linear regression model to historical data on user 401's investment performance over time, using the historical values as an input to estimate future values, i.e., a hypothetical projected value. A hypothetical projected value as used herein may refer to an estimated value of what the user's investment contributions may be worth over a certain period. The hypothetical projected value may serve as a forecast of what the user 401's investment may be in 2040. For example. user 401's hypothetical projected value in 2040 may be $14,985.82.

The hypothetical projected value may be based on at least one or more factors such as historical data, e.g., past transactions made by the user, the frequency of the user investing their money over time, interest rates, inflation, market volatility, and economic indicators. The hypothetical projected value may be used to manage risk for a user. For example, user 401 may have the option to adjust their suggested projected value using a toggle button 402 based on their own risk preference. A risk preference as used herein may refer to the risk aversion the user may have during investing. User 401 may use toggle button 402 to toggle between making investment decisions that are "low risk" or "high risk" for their suggested portfolio.

An example of a low-risk investment for a portfolio may include government bonds, which are low-risk due to government bonds being backed by the government, which results in the unlikeliness to default on the debt. Another example may include a diversified portfolio which may involve investing in different assets including stocks, bonds, and mutual funds to reduce the challenges of market fluctuations. An example of a high-risk investment for a portfolio may include user 401 investing in stocks, specifically penny stocks, as they trade at low prices and are associated with numerous price swings in the market.

Figure 5:
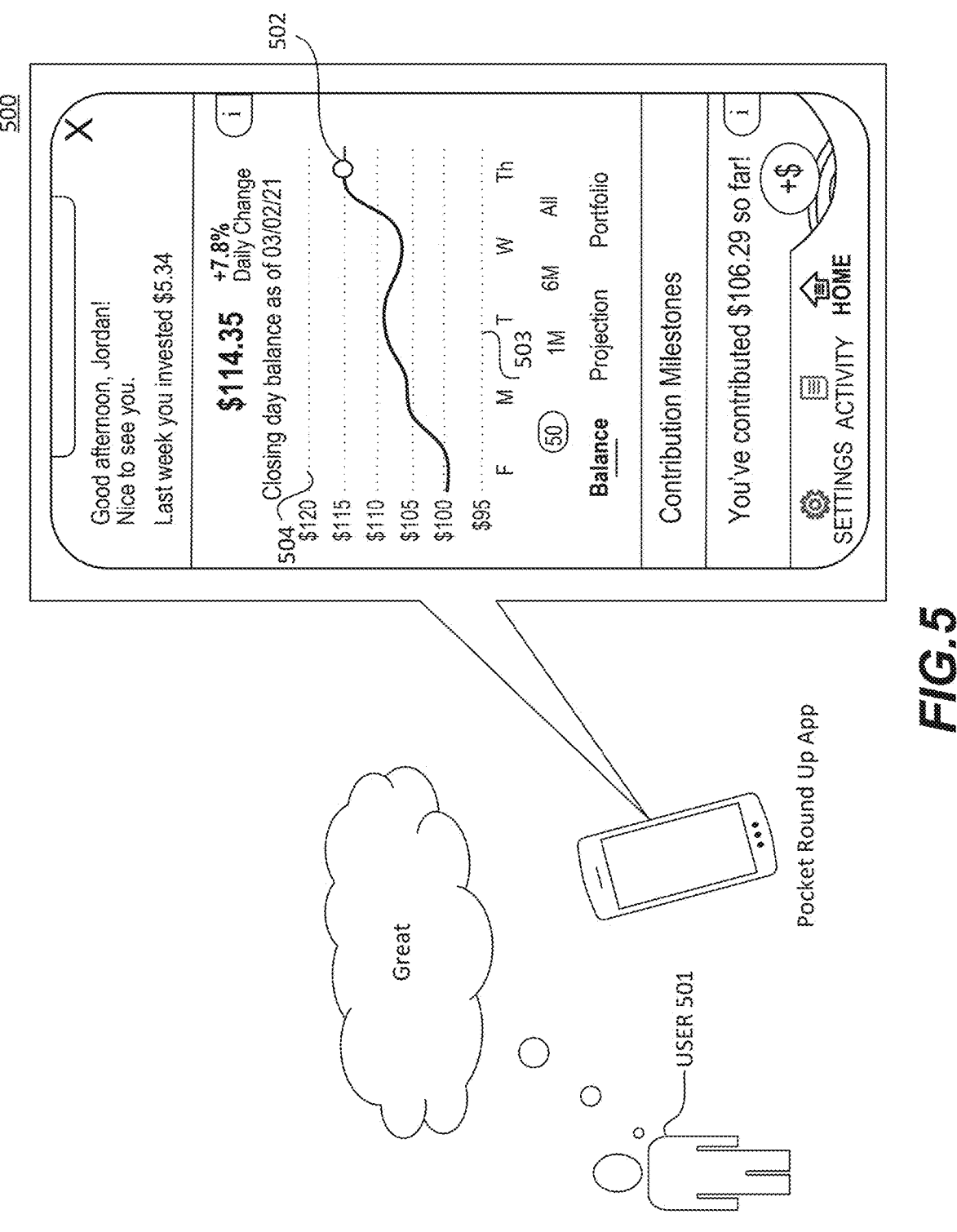
FIG. 5 depicts an exemplary illustration of a user receiving notification from the Pocket Application regarding their milestone contribution, consistent with disclosed embodiments.

FIG. 5 depicts an exemplary illustration of a user 501 using a mobile device 500 to receive notification from the Pocket Application regarding their milestone contribution. In this example, the Pocket Application may display the current closing day balance for user 501. For example, user 501 made their $5.34 weekly contribution for the previous week and their closing day balance is $114.35. A graph 502 depicts a linear graph that represents user 501's closing balance. Graph 502 includes an x-axis 503 that represents the days of the week that user 501 invests daily, while the y-axis 504 represents the range of contribution values that user 501 typically contributes. For example, user 501's closing day balance of $114.35 occurred on Thursday, representing user 501's peak closing day balance on Mar. 2, 2021.

Figure 6:
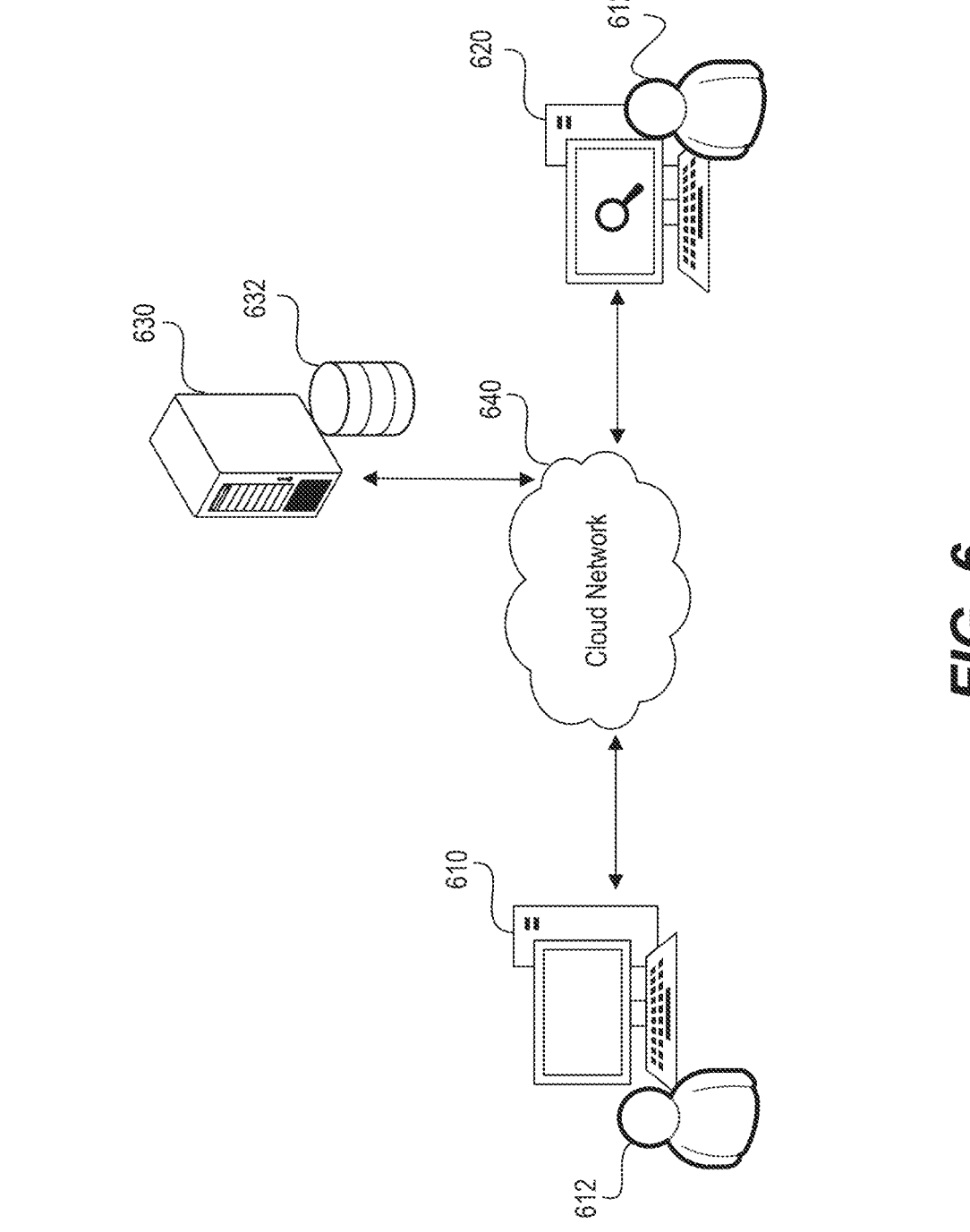
FIG. 6 depicts an exemplary illustration of a system environment for the Pocket Application, consistent with disclosed embodiments.

FIG. 6 depicts an exemplary illustration of a system environment 600 for a round-up application. System environment 600 may include one or more financial institution endpoint devices 610, one or more user endpoint devices 620, and one or more computing devices 630. System environment 600 may represent a system or network environment in which activities of a user 612 on financial institution endpoint device 610 are recorded and stored on computing device 630. A user 612 may then view these recorded activities on user endpoint device 620. The recording, transmission, and storage of the recorded user activity may be performed in a secure manner, such that only financial endpoint device 610 and user endpoint device 620 may have access to the recorded activity.

The various components of system 600 may communicate over a network 640. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/ cellular network, an enterprise or private data network, a storage area network, a virtual private network using a public network, a nearfield communications technique (e.g., Bluetooth, infrared, etc.), or various other types of network communications. In some embodiments, communications may take place across two or more of these forms of networks and protocols. While system environment 600 is shown as a network-based environment, it is understood that in some embodiments, one or more aspects of the disclosed systems and methods may also be used in a localized system, with one or more of the components communicating directly with each other.

User endpoint device 620 may be configured such that user 612 may access a protected navigation location through a browser or other software executing on user endpoint device 620. As used herein, a protected navigation location may be any network location deemed sensitive. As used herein, sensitive may refer to confidential information that requires protection from unauthorized access.

User endpoint device 620 may include any form of computer-based device or entity through which user 612 may access a protected navigation location. For example, user endpoint device 620 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may be capable of accessing web pages or other network locations. In some embodiments, user endpoint device 620 may be a virtual machine (e.g., based on AWS™, Azure™, IBM Cloud™, etc.), container instance (e.g., Docker™ container, Java™ container, Windows Server™ container, etc.), or other virtualized instance. Using the disclosed methods, activity of user 612 through user endpoint device 620 may be monitored and recorded by a browser extension executing on user endpoint device 620.

User endpoint device 620 may communicate with computing device 630 through network 640. For example, user endpoint device 620 may transmit recorded activity of user 612 to computing device 630. Computing device 630 may include any form of remote computing device configured to receive, store, and transmit data. For example, computing device 630 may be a server configured to store files accessible through a network (e.g., a web server, application server, virtualized server, etc.). Computing device 630 may be implemented as a Software as a Service (SaaS) platform through which software for auditing recorded user activity may be provided to an organization as a web-based service. In some embodiments, computing device 630 may be a decoupled Python server. Financial institution endpoint device 610 may similarly communicate with computing device 630 through network 640. User endpoint device 620 and financial institution endpoint device 610 may include some or all of components in FIG. 7, further discussed below.

Figure 7:
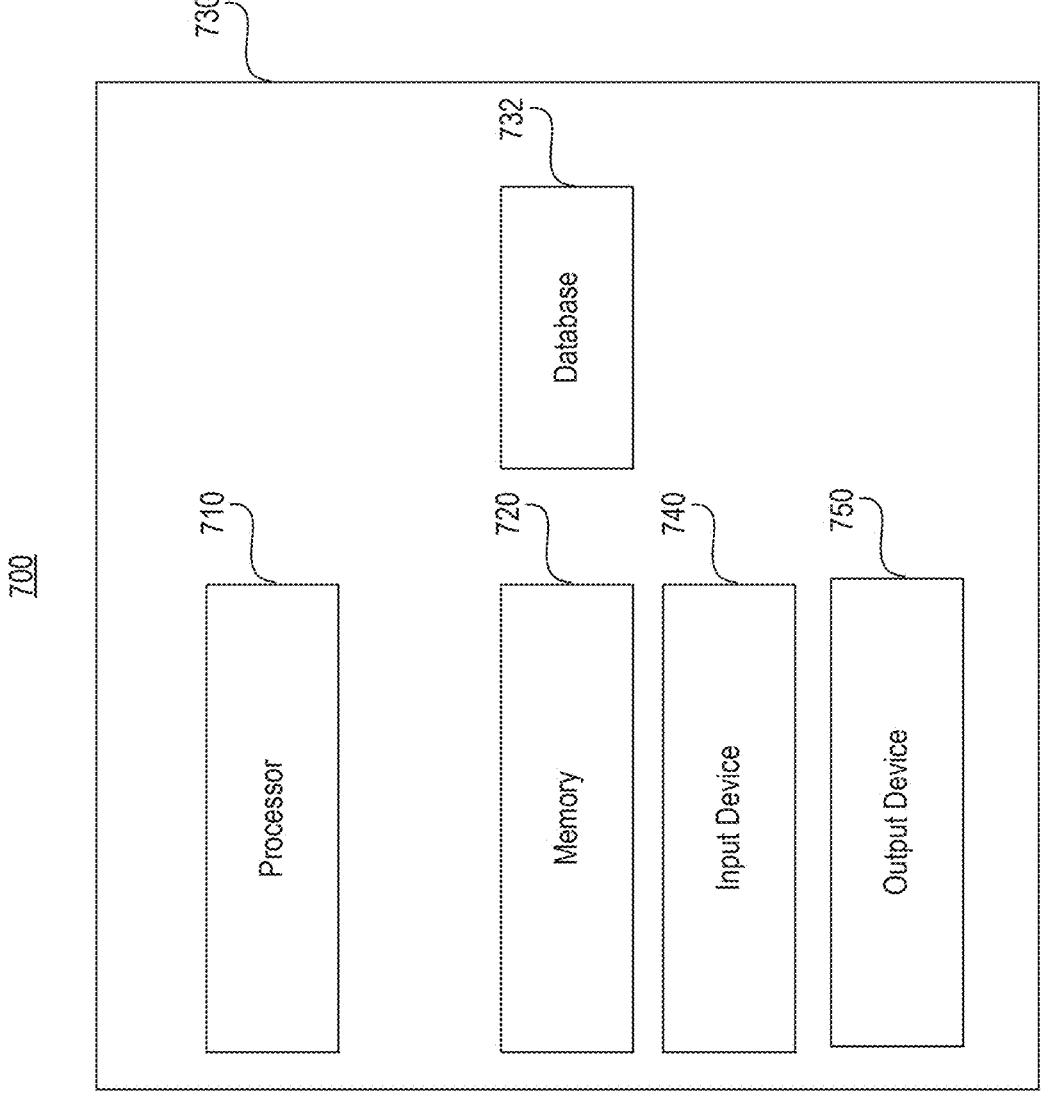
FIG. 7 depicts a block diagram showing an exemplary computational device, consistent with disclosed embodiments.

FIG. 7 depicts an exemplary illustration of a block diagram showing an exemplary server 700. For example, server 700 may be an example implementation of computing device 630. Server 700 may include one or more dedicated processors and/or memories. For example, server 700 may include a processor (or multiple processors) 710, and a memory (or multiple memories) 720.

Processor 710 may take the form of, but is not limited to, a microprocessor, embedded processor, or the like, or may be integrated in a system on a chip (SoC). Furthermore, according to some embodiments, processor 710 may be from the family of processors manufactured by Intel®, AMD®, Qualcomm®, Apple®, NVIDIA®, or the like. The processor 710 may also be based on the ARM architecture, a mobile processor, or a graphics processing unit, etc. The disclosed embodiments are not limited to any type of processor configured in server 1130.

Memory 720 may include one or more storage devices configured to store instructions used by the processor 710 to perform functions related to computing device 630. The disclosed embodiments are not limited to particular software programs or devices configured to perform dedicated tasks. For example, memory 720 may store a single program, such as a user-level application, that performs the functions associated with the disclosed embodiments, or may comprise multiple software programs. Additionally, processor 710 may, in some embodiments, execute one or more programs (or portions thereof) remotely located from server 700. Furthermore, memory 720 may include one or more storage devices configured to store data for use by the programs. Memory 720 may include, but is not limited to, a hard drive, a solid-state drive, a CD-ROM drive, a peripheral storage device (e.g., an external hard drive, a USB drive, etc.), a network drive, a cloud storage device, or any other storage device.

In some embodiments, server 700 may include an input device 740. Server 700 may include one or more digital and/or analog devices that allow communication with other machines and devices, such as other components of system 600. Computing device 630 may include one or more input/output devices. Input device 740 may be configured to receive input from the user, e.g., the user of computing device 630, and one or more components of server 700 may perform one or more functions in response to the input received. In some embodiments, input device 740 may include an interface displayed on a touchscreen (e.g., an output device 750). Output device 750 may include a screen for displaying communications to a user. For example, output device 750 may include a display configured to display the information relating to the transaction. Server 700 may include other components known in the art for interacting with a user. Output device 750 may also include one or more digital and/or analog devices that allow a user to interact with system 600, such as touch sensitive area, keyboard, buttons, or microphones.

In some embodiments, server 700 may include a database 732. Database 732 may be included on a volatile or non-volatile, magnetic, semiconductor, tape, optical, removable, non-removable, or other type of storage device or tangible or non-transitory computer-readable medium. Database 732 may also be part of server 700 or separate from server 700. When database 732 is not part of server 700, server 700 may exchange data with database 732 via a communication link. Database 732 may include one or more memory devices that store data and instructions used to perform one or more features of the disclosed embodiments. Database 732 may include any suitable databases, ranging from small databases hosted on a workstation to large databases distributed among data centers. Database 732 may also include any combination of one or more databases controlled by memory controller devices (e.g., server(s), etc.) or software. For example, database 732 may include document management systems, Microsoft SQL™ databases, SharePoint™ databases, Oracle™ databases, Sybase™ databases, other relational databases, or non-relational databases, such as mongo and others.

Figure 8:
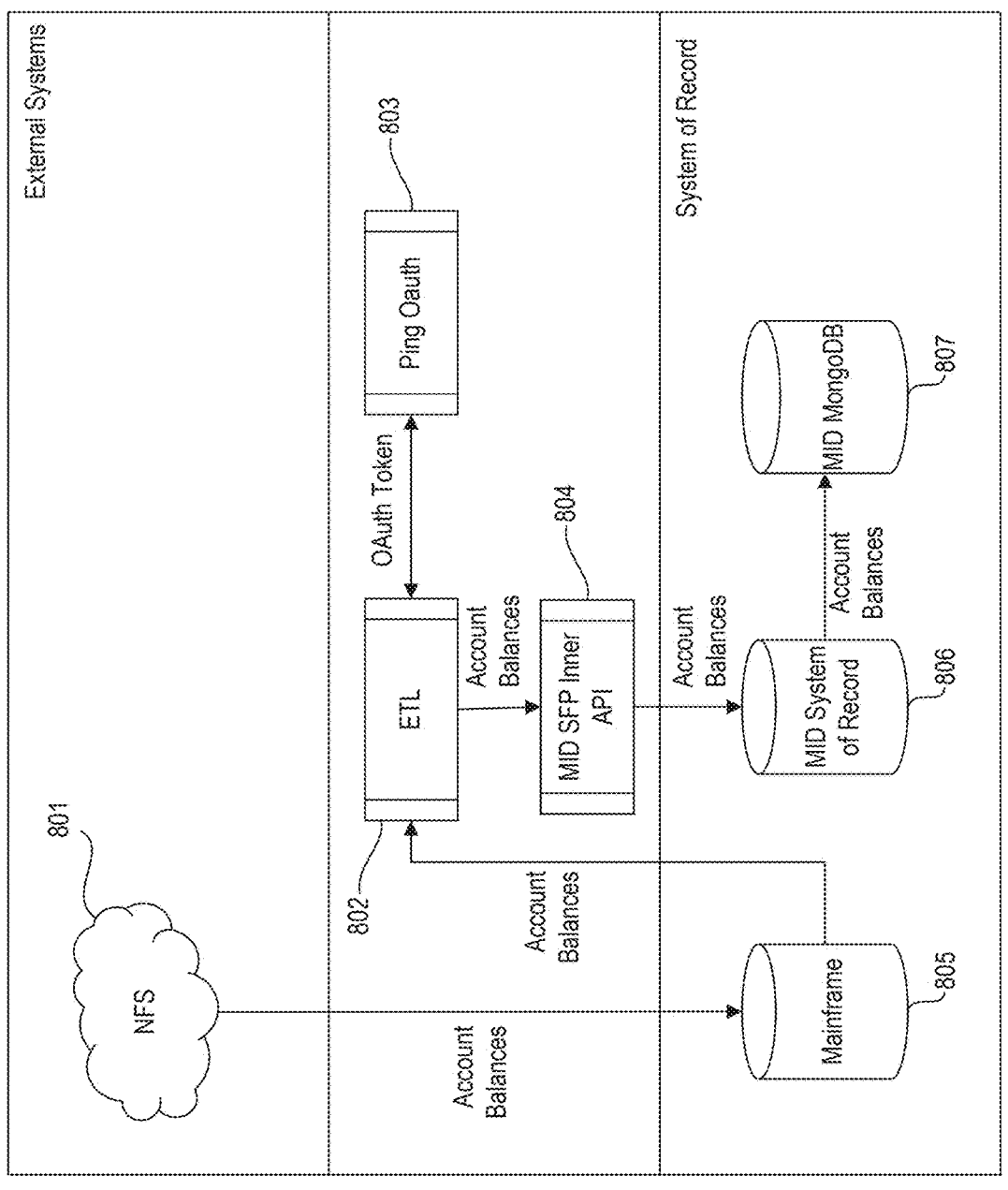
FIG. 8 depicts an exemplary system architecture diagram for rounding financial transactions, consistent with disclosed embodiments.

FIG. 8 depicts an exemplary illustration of a system architecture diagram of system 800 for rounding financial transactions. The Pocket Application may be implemented through the process of extracting pertinent information from one or more sources, to enable it to round up transactions.

For example, the Pocket Application may be able to extract data from at least one or more sources such as from client bank accounts, credit or debit cards or past transaction records. Data as used herein may refer to items of information related to the transactions associated with the user. An example may include transactional data which includes data associated with transactions made by the user such as the user's past transactions, the date of the transaction, or the payment method used. In one example, extracted data may include bank account data which includes data relating to the balance, type of account, and transaction history of the user's bank account.

Furthermore, extracted data may include credit or debit card data which includes data relating to the user's card number, expiration, or card limit. Upon the Pocket Application extracting these pieces of data, the Pocket Application may need to evaluate the data to determine the amount of spare change needed to round up the user's transaction.

System 800 may include an external distributed file network designated as NFS 801, a central data hub designated as Mainframe 802, a data integration process known as Extract, Transform, and Load designated as ETL 803, a transceiver device designated as MID SFP Inner API 804, an information management system designated as MID System of Record 805, an access token designated as PingOauth 806, a database program designated as MID MongoDB 807, and an additional access token designated as OAuth Token 808.

An NFS 801 as used herein may refer to a distributed file system protocol for shared storage. NFS 801 allows users to access files and directories located on a remote computer and treats those files and directories as they were local. For example, as depicted in FIG. 8, NFS 801 may store files in mainframe 802 due to a high volume of transactions that mainframe 802 can handle with high levels of accuracy. NFS 801 may store files in mainframe 802 by establishing network file shares that may be accessed by other systems. Network file shares may be used to store data files, documents, windows files, unix files, and database tables that can be accessed by multiple users.

A mainframe as used herein, may refer to a central data repository or hub used by corporations for critical applications such as bulk data processing for tasks such as large-scale transaction processing. Transaction processing as used herein may refer to a style of computing performed by large server computer that supports interactive applications. In transaction processing, work may be divided into individual operations called transactions. For example, as depicted in FIG. 8, mainframe 802 may be responsible for processing deposits, withdrawals, transfers, and payments, as well as maintaining account balances.

For example, when a purchase has been made using a credit or debit card, the transaction may be authorized by a payment processor, which may refer to a system that enables financial transactions, to handle transactions from various channels such as credit cards, debit cards, and bank accounts. The payment processor may communicate with the mainframe, to confirm the account balance of a customer. Mainframe 802 may then calculate the round-up amount based on the transaction amount and the rounding up rules specified by the financial institution.

For example, if the user's transaction amount is $45.50, then according to the Pocket Application, the transaction amount may be round up to the nearest dollar, in which the rounded-up amount would be $46. The difference between the given transaction amount and the rounded-up amount, e.g., 50 cents, will be the amount transferred into the designated savings account of the user. After the rounded-up amount is calculated, mainframe 802 updates the user's account balance to reflect their current transaction amount, and this information being stored in mainframe 802, can be accessed by other banking applications.

An ETL 803, i.e., may refer to a standard information management term used to describe a process for the movement and transformation of data. This may include moving data from one database, multiple databases, or other sources to a unified repository. ETL 803 undergoes three unique processes; Extraction, Transformation and Loading.

Extraction as used herein may refer to the process in which raw data is pulled from a source or multiple sources. Data could come from transactional applications, such as customer relationship management (CRM) data from Salesforce or enterprise resource planning (ERP) data, or Internet of Things (IOT) sensors that gather readings from a production line. Extraction typically involves combining data from these various sources into a single data set and then validating the data with invalid data flagged or removed. Extracted data may be in several formats, such as relational databases, XML, JSON, and others.

For example, ETL 803 may involve extracting data from at least one or more sources of mainframe 802 that may be responsible for transaction processing. In the context of the Pocket Application, this may include transactional data relating to rounded-up amounts, customer data related to rounding-up preferences, and data related to accounts, where rounded-up transactions are deposited into designated savings accounts.

Transformation as used herein may refer to the process in which data may be updated to match the needs of an organization and the requirements of its data storage solution. Transformation can involve standardizing (converting all data types to the same format), cleansing (resolving inconsistencies and inaccuracies), mapping (combining data elements from two or more data models), and augmenting (pulling in data from other sources).

Loading as used herein may refer to the process in which data is delivered and secured for sharing and making data available to other users. The transformed data may be loaded into mainframe 802, so that the data may be organized for analysis to enable financial institutions to gain additional information regarding customer behavior.

ETL 803 may be configured to establish a TLS secured HTTP connection with an Ping OAuth 806, that then passes the necessary OAuth credentials needed to retrieve an OAuth access token 808. TLS as used herein may refer to Transport Layer Security, which may be the internet-based transaction security provided by the Secure Sockets Layer (SSL) protocol, which Secure Sockets Layer (SSL) refers to the standard security technology for establishing an encrypted link between a server and a client.

For example, this may include a web server (website) and a browser, or a mail server and mail client (e.g., Outlook). The OAuth service as used herein may refer to a standard designed to allow a website or application to access resources (e.g., any hardware or software accessible by a computer, network, or another object connected to a computer) hosted by other web apps on behalf of a user. An access token as used herein may refer to a piece of data that represents the authorization to access resources on behalf of the end-user.

For example, once the access token is returned in an HTTP response, ETL 803 extracts and saves for use for API requests to the REST (Representational State Transfer) protocol, that has been created in order to establish a secure connection. Moreover ETL 803, makes a REST API request to the Ping OAuth 806 using a set of encrypted client credentials, which may consist of "client ID" and "client secret". Client ID as used herein may refer to an identifier associated with an application that assists with client or server OAuth 2.0 authentication. Client ID may be considered as sensitive information that needs to be secured from unauthorized access during transmission over a network or storage in a database. Client secret as used herein may refer to a secret known only to the OAuth application and the authorization server.

A REST API request as used herein may refer to a message that may be sent from a client application to a server application, to initiate an operation or retrieve information from a server. The REST (Representational State Transfer) is an HTTP protocol that allows for communication between the client and the server using a standard set of rules. The client may send a request to the server, requesting the operation it wants to perform and the server may provide a response. For example, ETL 803 may read the OAuth access token 808 request from Ping OAuth 806 service and then cache the request for 15 minutes. The body of the request may contain values such as the grant type, scope, client id, and client secret.

A body as used herein, may refer to data that may be sent along with a requested message. The body of a request may include any additional information or payload of the request that may be required to complete the request. A payload as used herein may refer to data that most pertains to the application, such as the user's name and when the OAuth access 808 token was issued. The payload may be considered as the body in the HTTP request and response message.

The grant type may refer to the exact sequences of steps that are involved in the OAuth process. The grant type may affect how the Pocket Application communicates with the OAuth access token 808 at each stage, notably how OAuth access token 808 itself may be sent.

The scope may refer to limited subsets of user data. For example, the scope in OAuth access token 808 may limit the Pocket Application's access to a user's account. OAuth access token 808 may be issued to the Pocket Application that may be granted READ and WRITE access to protected resources, or just READ access. So, if a client receives a token that has READ scope, and it tries to call an API endpoint that requires WRITE access, the call will fail.

The response of this request will contain a Ping OAuth access token 808 that will enable ETL 803 to connect to MID SFP Inner API 804, which may provide the account balances to the Pocket Application. The MID SFP (small-form factor pluggable) Inner API may refer to a transceiver module used for telecommunication and data communication applications. It may be used to support a wide variety of networking protocols and communication standards such as Ethernet, SDH, and SONET.

Moreover, once a Ping OAuth access token 808 has been acquired, it will be used to make an REST API request to pass the Pocket Application account balance data for each user to the MID SFP Inner API 804. The body of this request contains the following 3 fields: accountNumber, date, and balance Amount. The accountNumber relates to the account number associated with the account, the date relates to the date that the account was created and the balanceAmount relates to current balance of the account. These 3 fields will be recorded to the balance collection in MID MongoDB 807 via the MID SFP API 804 service. MongoDB as used herein may refer to an open-source document-based database management tool that stores data in JSON-like formats.

Both the Ping OAuth access token 808's request, and the MID SFP API 804's request require that ETL 803 create HTTP connectors to interact with these components. Each connector requires the public certificate of the HTTP service that is being consumed to be kept in a trust store within ETL 803 so that secure/encrypted HTTPS connections with these services can be created. The major benefit is the efficiency and availability of real-time data directly from the source to the application. It may also eliminate the unnecessary steps that previously required the data to be stored as a file on the server, which is then processed by the script to process and sent to the application. Because the application can now securely receive the real-time data, it improves user experience by providing instant information.

Additionally, because most applications now follow microservice architecture and use REST APIs to send and retrieve the data, the same REST APIs can also be reused by the ETL 803 tool to send the data to the applications. This reduces the overhead and integration points between ETL/Information and applications.

Figure 9:
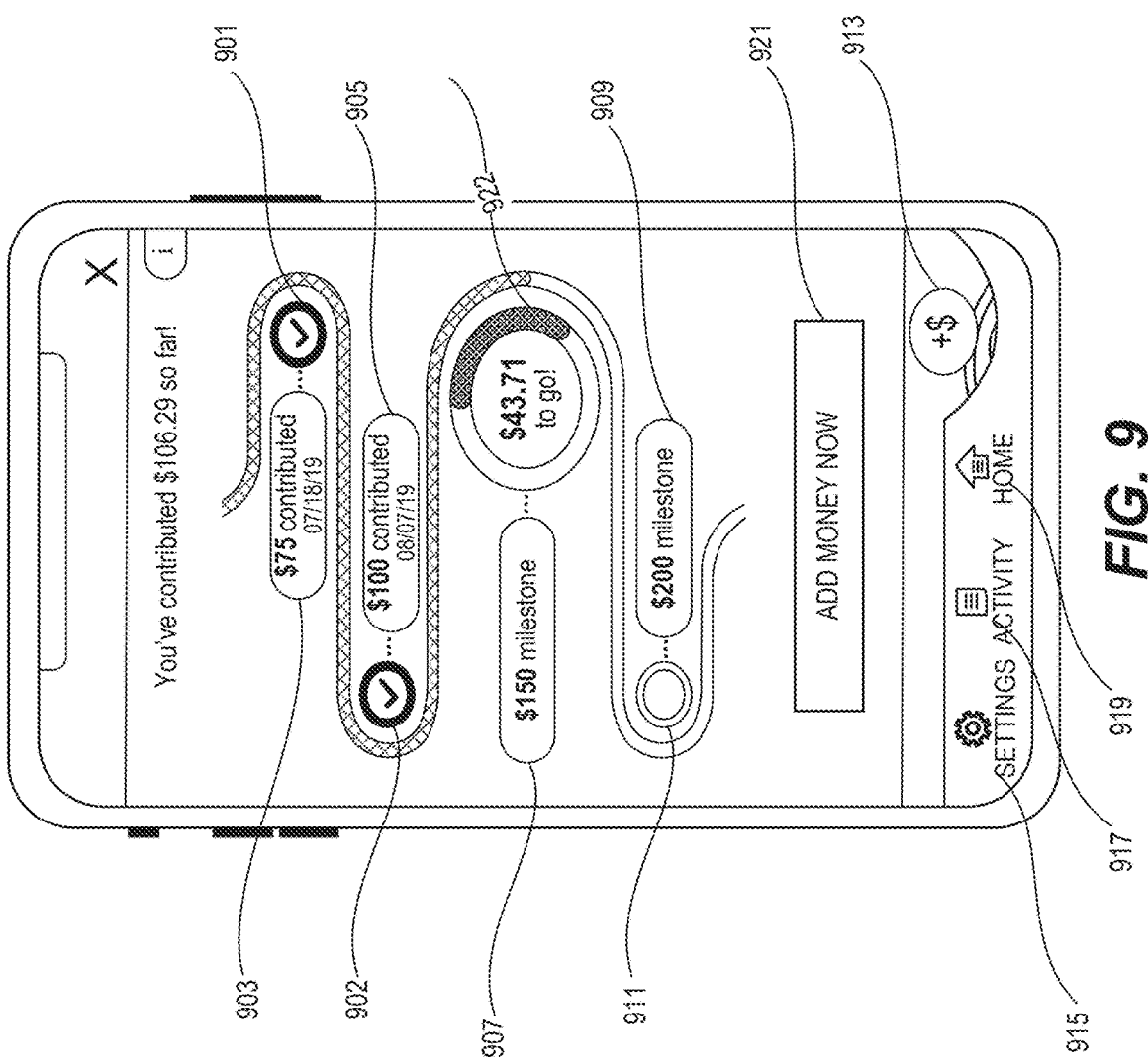
FIG. 9 depicts an exemplary illustration of a milestones map on a mobile device for visualizing a user's progression towards a desired investment portfolio for the Pocket Application, consistent with disclosed embodiments.

FIG. 9 depicts an exemplary illustration of a milestones map 900 on a mobile device for visualizing a user's progression towards a desired investment portfolio. Map 900 may include checkmark symbols 901 and 902. Map 900 may also include a contribution tracker 903, a contribution tracker 905, a contribution tracker 907, and a final milestone 909. Map 900 may also include a checkpoint indicator 922, a contribution icon 913, a meandering line 904, a settings symbol 915, an activity symbol 917, and a home symbol 919.

Disclosed embodiments may display, on a graphical user interface of the mobile device, a first progression indicator illustrating the meandering line containing, one or more concave portions and indicative of an unbounded measure having no defined end. A first progression indicator as used herein, may refer to a graphical user interface (GUI) element that represents the progression of an ongoing operation. The first progression indicator serves as a visual representation of how much of a milestone has been completed and how much is remaining to successfully complete the milestone. A milestone as used herein may refer to an event marking a significant change or stage during a process.

For example, in FIG. 9, the Pocket application's milestone map 900 represents the progression towards a specific goal such as reaching a $200 milestone for the user's investment goals. The milestones may be represented as a milestones map that consists of a series of circles and icons, each representing a successive milestone for contributions towards the user's financial goal. In some embodiments, the first progression indicator in the graphical user interface includes a checkmark symbol to represent an advancement of a checkpoint. For example, checkmark symbol 901 represents the initial progression of the milestone map for the Pocket Application.

In some embodiments, the completion symbol includes an indicator that represents the successful progression of a checkpoint. Indicator as used herein may refer to a value to indicate progress towards a specific goal. For example, both checkmark symbols 901 and 902 represent the successive contributions for both contribution trackers 903 and 905, in which they may represent the monetary contribution that the user has invested into their account. For example, contribution tracker 903 may have a monetary value of $75, contribution tracker 905 may have a monetary value of $100, and contribution tracker 907 may have a monetary value of $150.

A meandering line as used herein may refer to a line that curves. For example, a meandering line 904 of the milestone map 900 in graphical user interface for the Pocket Application, may be displayed after the completion of a milestone, in which the meandering line may change colors. A milestone that has not been yet completed, may have meandering line 904 that may not change color and instead remains blank until a successful milestone contribution has been made.

In some embodiments, the one or more concave portions is a section associated with the navigation of a key progress indicator representing the progression of the checkpoint. A concave portion as used herein may refer to the curved section of a shape or object. For example, the meandering line 904 may contain a concave portion that represents the meandering line 904 being curved inward for visualizing the progression of a milestone contribution. An unbounded measure as used herein may refer to a measure that has no defined end or limit. The unbounded measure may continue to increase or decrease without reaching a minimum or maximum value. For example, the number of monetary contributions for the Pocket Application, may be an unbounded measure as the user could continue to make as much contributions without any limit. Yet, with a set milestone, the user may be able to set a specific milestone (e, g, $200 as final milestone 909 depicted in FIG. 9), which would provide a defined end point for the milestone.

In some embodiments, the first progression indicator in the graphical user interface for the Pocket Application includes a metric to measure progress tracked over time for a checkpoint of a user. A metric as used herein may refer to a standard of measurement. For example, the metric used to measure progress for milestone map 900 in FIG. 9, may be based on a monetary-based metric. This may involve contributing funds to reach the final milestone 909 of $200. Contribution trackers 903, 905, and 907 all represent the monetary contributions (e.g., $75, $100 and $150) made by the user, for progression towards reaching the $200 milestone. A checkpoint as used herein may refer to a point that indicates a major goal, event, or task within a milestone. For example, checkpoint indicator 922 may be represented as the partial progression towards the user's $200 milestone.

In some embodiments, the closed object is a contribution icon, and selection of the contribution icon causes one or more processors to allow a user to start a checkpoint process. In some embodiments, the closed object contains a menu configured to permit a user to select between one or more different toggle options. A contribution icon as used herein may refer to a button that may be available to a user to select to add funds. In FIG. 9, a user may be able to select contribution icon 913 to add money to their designated savings account. The contribution icon 913 lies directly next to a menu that contains toggle options such as setting symbol 915, activity symbol 917, and home symbol 919. Setting symbol 915 may allow for the user to update their settings within the Pocket application such as updating preferences for their account, activity symbol 917 may allow for the user to view recent activity such as recent transactions to their account, and home symbol 919, may allow for the user to return to the home page of the Pocket application.

Disclosed embodiments may involve receiving a first signal indicating a first accumulation of a bounded measure. In some embodiments, the first signal is an indication received by a user. A first signal as used herein may refer to a specific event that indicates progress towards a milestone. The signal may be generated by a processor that will indicate to the user that the initial milestone has been completed.

In some embodiments, the first signal includes the first accumulation of the bounded measure in response to the received first signal. A first accumulation as used herein may refer to the completion of an event. For example, in FIG. 9, checkmark symbol 901 may be completed upon the user contributing $75 (e.g. contribution tracker 903). The progression towards reaching the milestone accumulates each time a milestone has been completed. A bounded measure may refer to the maximum value that has been set. For example, the bounded measure for the user may be $200 (e.g., final milestone 909) unless the user decides to increase their specified milestone goal. In some embodiments, the system observes inputs associated with the advancement of the checkpoint. For example, the Pocket Application processes the inputs associated with the advancement of the checkpoint. The inputs as used herein may refer to any information or data that is sent to a computer for processing. For example, the inputs in FIG. 9 would be the amount of money that may be contributed to the user's milestone, that would then be processed by the Pocket Application to indicate progression towards the user's specified milestone.

Disclosed embodiments may involve being responsive to receiving the first signal, causing a first update to the graphical user interface including graphically illustrating a partial traversing of a closed object, and illustrating within at least a portion of a first concave portion of the one or more concave portions of the meandering line. In some embodiments, the first update in a graphical user interface reflects an input of resources allocated towards a checkpoint goal of the user. Update as used herein, may refer to the act or instance of updating. For example, a first update may be considered as the update signifying that the user's milestone has been successfully completed. Traversing as used herein may refer to pass, move, or extend over, across, or through. For example, checkpoint indicator 922 may represent the partial traversal of the meandering line 904, which indicates that the user has made partial progression towards their final milestone 909. Resources as used herein may refer to the financial capital available to a user, for achieving their financial goals. For example, resources may be allocated towards the checkpoint goal of the user through contributing funds as shown with the monetary values displayed in contribution tracker 903, contribution tracker 905 and contribution tracker 907.

Disclosed embodiments may involve receiving a second signal indicating a second accumulation of the bounded measure. In some embodiments, the second signal is an indication of a second accumulation of a bounded measure to display a second progression indicator to represent the advancement of the checkpoint. The signal may be generated by a processor that will indicate to the user that the second milestone has been completed. For example, in FIG. 9, checkmark symbol 902 may be completed upon the user contributing $100 (e.g., contribution tracker 905).

The progression towards reaching the milestone accumulates each time a milestone has been completed. For example, the bounded measure for the user may be $200 (e.g., final milestone 909) unless the user decides to increase their specified milestone goal. The second progression indicator serves as a visual representation of how much a milestone has been completed and how much is remaining to successfully complete the milestone.

Disclosed embodiments, may display, on the graphical user interface, a second progression indicator situated within one of the concave portions and illustrating a closed object indicative of a bounded measure having a defined end, the defined end indicated by completely traversing the closed object. For example, checkpoint indicator 922 may be situated within the concave portion of the meandering line 904, where checkpoint indicator 922 shows the remaining balance that the user has contributed so far. Since the user did not make a contribution for that day, meandering line 904 remains situated at checkpoint indicator 922 until the user decides to further contribute to reach their final milestone, which may be depicted as final milestone 909 in FIG. 9.

Disclosed embodiments may involve causing a second update to the graphical user interface including graphically illustrating a complete traversing of the closed object and illustrating an advancement of the first progression indicator along the meandering line beyond the first concave portion. For example, checkmark symbol 902 may represent the complete traversal of the meandering line 904, which indicates that the user has made further progression towards their final milestone 909 by successfully contributing funds. In some embodiments, the second update in a graphical user interface reflects an input of resources allocated towards a checkpoint goal of the user. For example, the resources may be allocated towards the checkpoint goal of the user represented as contribution tracker 902, in which the user has contributed $100.

Disclosed embodiments, may cause a third update to the graphical user interface to graphically illustrate a completion after the first progression indicator graphically illustrates the advancement, generating a third display that replaces the closed object with a completion symbol. For example, upon the user deciding to contribute the amount reflected in checkpoint indicator 922 (e.g., $43.71), a final checkmark symbol may be displayed to represent the completion of the user's final milestone. In some embodiments, the third update in a graphical user interface reflects an input of resources allocated towards the completion of a checkpoint. For example, the resources may be allocated towards the checkpoint goal of the user may be represented as contribution tracker 907, in which the user has contributed $150.

FIG. 10 depicts an exemplary user interface 1000 for a mobile device for visualizing various products and offers. In some embodiments, the closed object is a user history icon. A user history icon may refer to an icon that represents the user's credit card history. For example, as depicted in FIG. 10, the user may be able to select user history icon 1002, as they may be pre-selected for a credit card due to their exemplary credit history. In some embodiments, the selection of the user history icon in a graphical user interface causes one or more processors to display a user history associated with a user. For example, upon the user selecting user history icon 1002, the user may be able to view information relating to the user's credit history. The information may be obtained from the respective financial institution's that maintains the user's credit information.

Credit history as used herein may refer to the representation of the user's creditworthiness based on their credit history. User interface 1000 may display important details relating to the user's credit accounts, credit limit, credit balance, payment history or past owed debts on their credit card. To display this information, user interface 1000 may need to be connected to a database that stores the credit information of the user, such as the MID MongoDB 807 described in respect to FIG. 8.

User Interface 1000 may include Credit Card Icon 1004, which presents different credit card options for the user to select, that may provide advantageous benefits including cash back rewards, lower rates, and rewards for travel expenses.

In some embodiments, the closed object is a pocket icon. The pocket icon as used herein refers to the Pocket Application that may be used for rounding up financial transactions for a milestone, as described above with respect to FIG. 9. In some embodiments, the selection of the pocket icon causes one or more processors to consistently increment inputs. For example, as described above with respect to FIG. 9, inputs in for Pocket Icon 1003 would be the amount of money that may be contributed to the user's milestone, that would then be processed by the Pocket Application to indicate progression towards the user's specified milestone. Increment as used herein may refer to an increase or addition. The inputs may be incremented upon the user increasing their contribution towards their milestone by a desired amount needed to reach their final milestone contribution (i.e., final milestone 909).

FIG. 11 depicts a flowchart for method 1100 of rounding financial transactions. Operation 1102 may involve displaying, on a graphical user interface, a first progression indicator, as explained above with respect to FIG. 9. Operation 1104 may involve receiving a first signal as explained above with respect to FIG. 9, indicating a first accumulation of a bounded measure as for example. Operation 1106 may involve being responsive to receiving the first signal, as explained with respect to FIG. 9. Operation 1108 may involve receiving a second signal, as explained above with respect to FIG. 9, indicating a second accumulation of the bounded measure. Operation 1110 may involve displaying, as explained above with respect to FIG. 9, on the graphical user interface, a second progression indicator. Operation 1112 may involve causing a second update, as explained above with respect to FIG. 9, to the graphical user interface. Operation 1114 may involve causing a third update as explained above with respect to FIG. 9, to the graphical user interface. Operation 1116 may involve generating a third display, as explained above with respect to FIG. 9, that replaces the closed object with a completion symbol.

Figure 12:
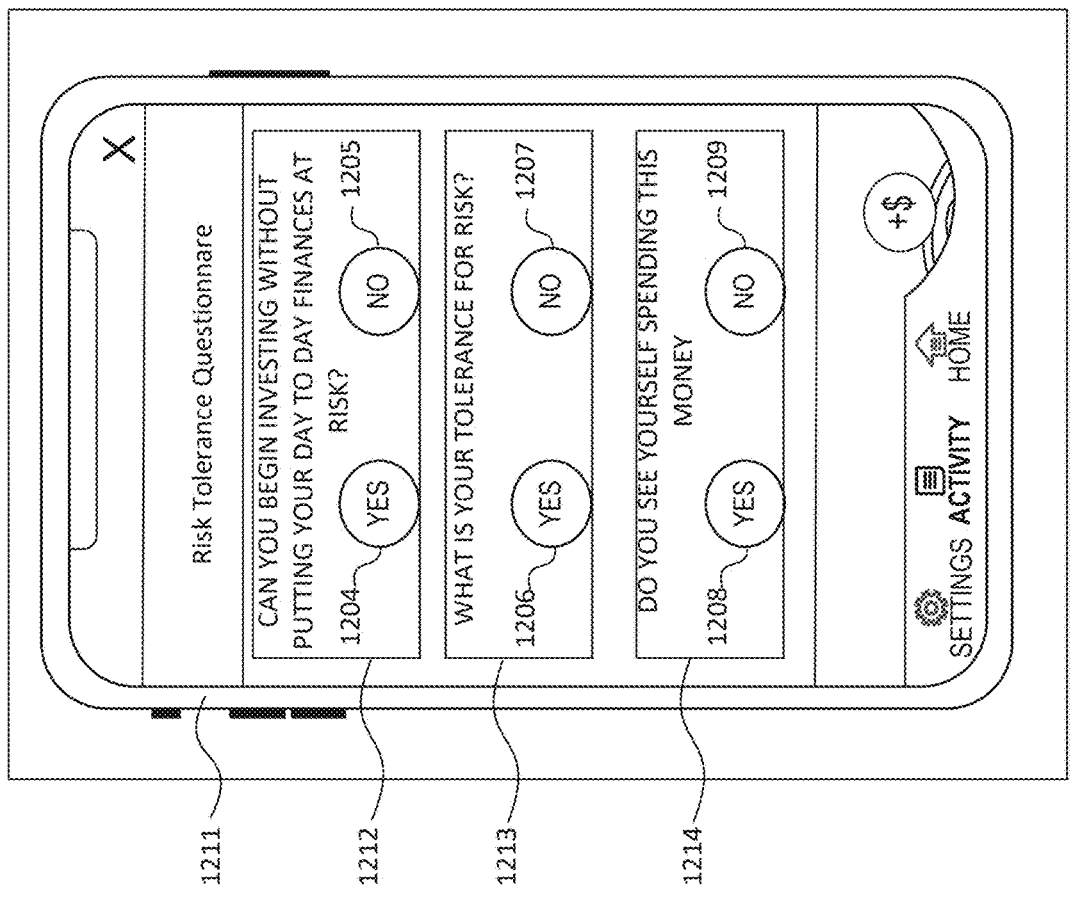
FIG. 12 depicts an exemplary user interface on a mobile device for a risk tolerance questionnaire, consistent with disclosed embodiments.

FIG. 12 depicts an exemplary user interface 1200 on a mobile device for a risk tolerance questionnaire. Banner 1211 is titled "Risk Tolerance Questionnaire". System 1200 may include Questionnaire 1212, Questionnaire 1213, and Questionnaire 1214.

The risk tolerance questionnaire 1211 may be used to gauge the risk tolerance for a user prior to them wanting to invest long-term. Risk tolerance as used herein may refer to the degree of risk that an investor is willing to endure given the volatility in the value of an investment. The risk tolerance questionnaire 1211 may be comprised of three questions relating to the risk tolerance of a user.

Questionnaire 1212 involves asking the user, "Can You Begin Investing Without Putting Your Day To Day Finances At Risk"?. This question may be asked, as this question may consider if the user has enough money set aside from their typical balance to invest long-term in certain investments. Questionnaire 1212 includes "yes" selection 1204 and "no" selection 1205.

Questionnaire 1213 involves asking the user, "What Is Your Tolerance For Risk"? to determine the type of investor the user is. The user may be a conservative investor, or one with a low risk tolerance, who favors investments that maintain his or her original investment or an aggressive investor, or one with a high-risk tolerance, who may be willing to risk losing money to get potentially better results. Questionnaire 1213 includes "yes" selection 1206 and "no" selection 1207.

Questionnaire 1215 involves asking the user "Do You See Yourself Spending This Money"? to determine if the user may have the urge to spend money that they have invested, as this may affect the user's risk tolerance. An investor who may not have the urge to spend their invested funds, may favor lower-risk investments as they are primarily focused on maintaining their investments, while a high-risk investor may want to take on greater risk to maximize their earnings. The low-risk investor may be more cautious to take on additional risk and instead would want to hold onto investments for an ideal period to sell, while a high-risk investor may not have the same caution for additional risk and instead would want to take on more risk, to maximize their earnings. Questionnaire 1215 includes "yes" selection 1208 and "no" selection 1209.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described herein can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship with each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive.

Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system of managing financial data comprising:
a memory storing instructions;
one or more processors; and
a graphical user interface configured to execute the instructions to:
display, on the graphical user interface, a first progression indicator illustrating a meandering line containing one or more concave portions with financial checkpoints that ultimately lead to a final financial milestone;
receive a first signal upon contribution of an initial financial amount towards a first financial checkpoint;
responsive to receiving the first signal, causing a first update to the graphical user interface including graphically illustrating the contribution of the initial financial amount by the filling in of at least a portion of a first concave portion of the one or more concave portions of the meandering line;
receive a second signal upon contribution of a second financial amount towards the first financial checkpoint;
display, on the graphical user interface, the contribution of the second financial amount;
cause a second update to the graphical user interface including graphically illustrating the contribution of the second financial amount by continuing to fill in the first concave portion of the one or more concave portions of the meandering line, wherein the amount filled in of the first concave portion after contribution of the second financial amount is more than that filled in after contribution of the initial financial amount; and cause a third update to the graphical user interface to graphically illustrate completion of the first financial checkpoint by generating a completion symbol.

2. The system of claim 1, wherein the first progression indicator in the graphical user interface includes a metric to measure progress tracked over time for augmenting the first financial checkpoint.

3. The system of claim 1, wherein the first progression indicator in the graphical user interface includes a checkmark symbol signifying advancement of the first financial checkpoint.

4. The system of claim 3, wherein the one or more concave portions is a section associated with the navigation of a key progress indicator signifying progression of the first financial checkpoint.

5. The system of claim 1, wherein the system observes inputs associated with the advancement of the first financial checkpoint.

6. The system of claim 1, wherein the first signal is an indication received by a user.

7. The system of claim 1, wherein the first signal includes the contribution of the initial financial amount towards the first financial checkpoint.

8. The system of claim 1, wherein the first update in the graphical user interface signifies input of resources allocated towards the first financial checkpoint.

9. The system of claim 1, wherein the second signal 0 includes the contribution of the second financial amount towards the first financial checkpoint to display a second progression indicator signifying advancement of the first financial checkpoint.

10. The system of claim 1, wherein the second update in the graphical user interface shows input of resources allocated towards the first financial checkpoint.

11. The system of claim 1, wherein the third update in the graphical user interface shows input of resources allocated towards the completion of the first financial checkpoint.

12. The system of claim 1, wherein the completion symbol includes an indicator signifying successful progression of the first financial checkpoint.

13. A method of managing financial data, the method comprising:
displaying, on a graphical user interface, a first progression indicator illustrating a meandering line containing one or more concave portions with financial checkpoints that ultimately lead to a final financial milestone;
receiving a first signal upon contribution of an initial financial amount towards a first financial checkpoint;
responsive to receiving the first signal, causing a first update to the graphical user interface including graphically illustrating the contribution of the initial financial amount by the filling in of at least a portion of a first concave portion of the one or more concave portions of the meandering line;
receiving a second signal upon contribution of a second financial amount towards the first financial checkpoint;
displaying, on the graphical user interface, the contribution of the second financial amount;
causing a second update to the graphical user interface including graphically illustrating the contribution of the second financial amount by continuing to fill in the first concave portion of the one or more portions of the meandering line, wherein the amount filled in of the first concave portion after contribution of the second financial amount is more than that filled in after contribution of the initial financial amount; and causing a third update to the graphical user interface to graphically illustrate completion of the first financial checkpoint by generating a completion symbol.

14. The method of claim 13, wherein the first progression indicator in the graphical user interface includes a metric to measure progress tracked over time for augmenting the first financial checkpoint.

15. The method of claim 13, wherein the first progression indicator in the graphical user interface includes a check-mark symbol signifying advancement of the first financial checkpoint.

16. The method of claim 13, wherein the one or more concave portions is a section associated with the navigation of a key progress indicator signifying-progression of the first financial checkpoint.

17. The method of claim 13, wherein the first update in the graphical user interface shows input of resources allocated towards the first financial checkpoint.

18. The method of claim 13, wherein the second update in the graphical user interface shows input of resources allocated towards the first financial checkpoint.

19. The method of claim 13, wherein the third update in the graphical user interface shows input of resources allocated towards the completion of the first financial checkpoint.

20. The method of claim 13, wherein the completion symbol includes an indicator signifying successful progression of the first financial checkpoint.

* * * * *